United States Patent
Shimura et al.

(10) Patent No.: US 9,466,827 B2
(45) Date of Patent: Oct. 11, 2016

(54) SECONDARY BATTERY

(75) Inventors: Midori Shimura, Tokyo (JP); Daisuke Kawasaki, Tokyo (JP); Masahiro Suguro, Tokyo (JP); Yoko Hashizume, Tokyo (JP); Kazuaki Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/820,451

(22) PCT Filed: Jun. 23, 2011

(86) PCT No.: PCT/JP2011/064406
§ 371 (c)(1),
(2), (4) Date: Mar. 1, 2013

(87) PCT Pub. No.: WO2012/029386
PCT Pub. Date: Mar. 8, 2012

(65) Prior Publication Data
US 2013/0164605 A1  Jun. 27, 2013

(30) Foreign Application Priority Data
Sep. 2, 2010 (JP) ................................. 2010-196620

(51) Int. Cl.
*H01M 4/134* (2010.01)
*H01M 4/1393* (2010.01)
(Continued)

(52) U.S. Cl.
CPC .......... *H01M 4/133* (2013.01); *H01M 2/0287* (2013.01); *H01M 4/134* (2013.01); *H01M 4/505* (2013.01); *H01M 4/525* (2013.01); *H01M 4/621* (2013.01); *H01M 10/0525* (2013.01);
(Continued)

(58) Field of Classification Search
None
See application file for complete search history.

(56) References Cited

U.S. PATENT DOCUMENTS

2002/0094479 A1*  7/2002  Gan et al. ............... 429/212
2003/0049527 A1*  3/2003  Yageta et al. ............ 429/179
(Continued)

FOREIGN PATENT DOCUMENTS

| JP | 6-325765 A | 11/1994 |
| JP | 2003-007336 A | 1/2003 |

(Continued)

OTHER PUBLICATIONS

International Search Report of PCT/JP2011/064406, dated Oct. 4, 2011.

*Primary Examiner* — Cynthia K Walls
(74) *Attorney, Agent, or Firm* — Sughrue Mion, PLLC

(57) ABSTRACT

An object of the present invention is to provide a secondary battery in which the decomposition of an electrolyte liquid is suppressed and the generation of a gas is reduced, even in the case of using a laminate film as a package. The present exemplary embodiment is a secondary battery of a stacked laminate type comprising an electrode assembly in which a positive electrode and a negative electrode are arranged to face each other, an electrolyte liquid, and a package accommodating the electrode assembly and the electrolyte liquid, wherein the negative electrode is made by binding a negative electrode active substance containing a metal (a) capable of being alloyed with lithium, a metal oxide (b) capable of occluding and releasing lithium ions, and a carbon material (c) capable of occluding and releasing lithium ions, to a negative electrode current collector, with at least one selected from polyimides and polyamideimides; and the electrolyte liquid comprises acrylonitrile or an acrylonitrile compound being an acrylonitrile derivative.

13 Claims, 1 Drawing Sheet

(51) Int. Cl.
*H01M 4/133* (2010.01)
*H01M 2/02* (2006.01)
*H01M 4/505* (2010.01)
*H01M 4/525* (2010.01)
*H01M 4/62* (2006.01)
*H01M 10/0525* (2010.01)
*H01M 10/0567* (2010.01)
*H01M 10/0568* (2010.01)
*H01M 10/0569* (2010.01)
*H01M 10/0585* (2010.01)

(52) U.S. Cl.
CPC ..... *H01M10/0567* (2013.01); *H01M 10/0568* (2013.01); *H01M 10/0569* (2013.01); *H01M 10/0585* (2013.01); *Y02E 60/122* (2013.01); *Y02T 10/7011* (2013.01)

(56) References Cited

U.S. PATENT DOCUMENTS

| | | | |
|---|---|---|---|
| 2003/0215711 A1* | 11/2003 | Aramata et al. | 429/218.1 |
| 2005/0084765 A1 | 4/2005 | Lee et al. | |
| 2009/0111031 A1* | 4/2009 | Hirose et al. | 429/218.1 |
| 2010/0035146 A1* | 2/2010 | Fujii et al. | 429/200 |

FOREIGN PATENT DOCUMENTS

| | | |
|---|---|---|
| JP | 2003-086247 A | 3/2003 |
| JP | 2003-123740 A | 4/2003 |
| JP | 2004-047404 A | 2/2004 |
| JP | 2004-253296 A | 9/2004 |
| JP | 2005-072003 A | 3/2005 |
| JP | 2005-183264 A | 7/2005 |
| JP | 2008-153117 A | 7/2008 |
| JP | 2008-166271 A | 7/2008 |
| JP | 2009-123499 A | 6/2009 |

* cited by examiner

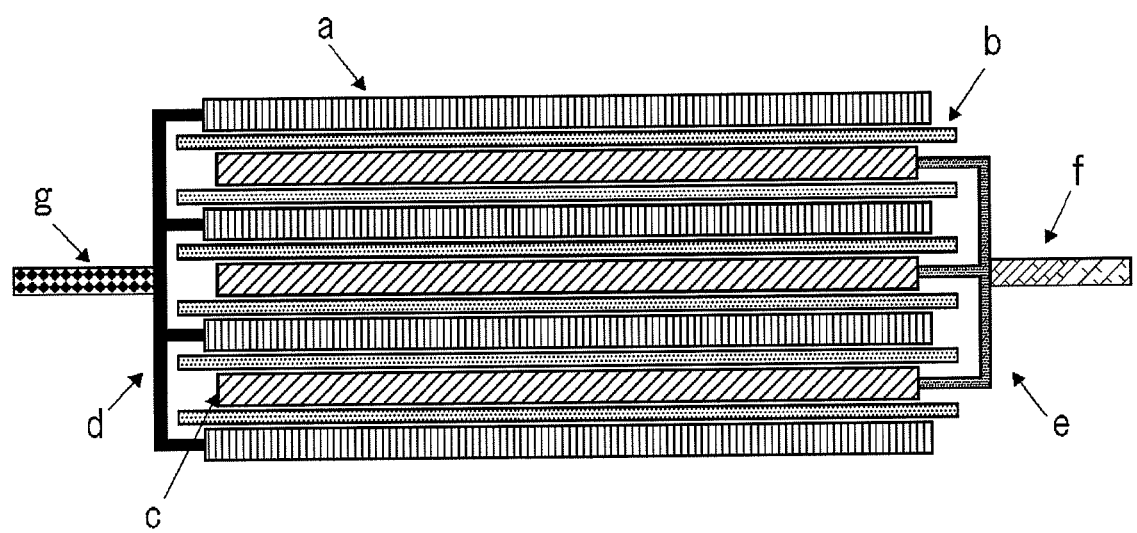

SECONDARY BATTERY

CROSS REFERENCE TO RELATED APPLICATIONS

This is a National Stage of International Application No. PCT/JP2011/064406 filed Jun. 23, 2011, claiming priority based on Japanese Patent Application No. 2010-196620 filed Sep. 2, 2010, the contents of all of which are incorporated herein by reference in their entirety.

TECHNICAL FIELD

The present exemplary embodiment relates to a secondary battery, particularly to a lithium ion secondary battery.

BACKGROUND ART

Along with the rapid market expansion of notebook personal computers, cell phones, electric cars and the like, high-energy density secondary batteries are in demand. Means of obtaining high-energy density secondary batteries include a method of using a large-capacity negative electrode material, and a method of using a nonaqueous electrolyte liquid excellent in stability.

Patent Literature 1 discloses the utilization of an oxide of silicon or a silicate salt for a negative electrode active substance of a secondary battery. Patent Literature 2 discloses a negative electrode for a secondary battery having an active substance layer containing a carbon material particle capable of occluding and releasing lithium ions, a metal particle capable of being alloyed with lithium, and an oxide particle capable of occluding and releasing lithium ions. Patent Literature 3 discloses a negative electrode material for a secondary battery, which is obtained by coating carbon on the surface of a particle having a structure in which microcrystals of silicon are dispersed in a silicon compound.

Patent Literature 4 discloses the use of a negative electrode capable of occluding and releasing lithium, and the use of a nitrile compound having a carbon-carbon unsaturated bond as an electrolyte liquid.

Patent Literature 5 discloses the use of an electrolyte liquid containing a nitrile compound having a specific structure.

CITATION LIST

Patent Literature

Patent Literature 1: JP6-325765A
Patent Literature 2: JP2003-123740A
Patent Literature 3: JP2004-47404A
Patent Literature 4: JP2003-86247A
Patent Literature 5: JP2008-166271A

SUMMARY OF INVENTION

Technical Problem

However, if the secondary battery utilizing an oxide of silicon for its negative electrode active substance, described in Patent Literature 1, is charged and discharged at 45° C. or higher, the reduction in the capacity subject to the charge/discharge cycle becomes remarkably large in some cases.

The negative electrode for a secondary battery described in Patent Literature 2 has an effect of relaxing the volume change of the negative electrode as a whole on occlusion and release of lithium, due to the differences in charge/discharge potential between the three components. However, in Patent Literature 2, there have been some points which have not been sufficiently studied, regarding a relationship among three kinds of components in a state of coexistence, and regarding the binder, an electrolyte liquid, a conformation of an electrode assembly, and an outer packaging body which are indispensable for fabricating a lithium ion secondary battery.

The negative electrode material for a secondary battery described in Patent Literature 3 also has an effect of relaxing the volume change of the negative electrode as a whole. However, in Patent Literature 3, there have been some points which have not been sufficiently studied, regarding a binder, an electrolyte liquid, a conformation of an electrode assembly and a package which are indispensable for fabricating a lithium ion secondary battery.

In Patent Literatures 4 and 5, there have been some points which have not been sufficiently studied, regarding a negative electrode active substance, a negative electrode binder, a conformation of an electrode assembly and a package which are indispensable for fabricating a lithium ion secondary battery.

The case of a secondary battery using a laminate film as the package causes a larger strain of the electrode assembly, when gas is generated, than the case of a secondary battery using a metal can as the package. This is because the laminate film is more liable to be deformed due to the internal pressure of the secondary battery than a metal can. Further, in the case of a secondary battery in which a laminate film is used as a package, when it is sealed, the inner pressure of the battery is generally set to be lower than atmospheric pressure. Thus, the battery does not have extra space, which can easily and directly cause a volume change of the battery and deformation of the electrode assembly when gas is generated.

Then, an object of the present exemplary embodiment is to provide a secondary battery in which decomposition of an electrolyte liquid is suppressed and generation of a gas is reduced, even in the case of using a laminate film as a package.

Solution to Problem

The present exemplary embodiment is a secondary battery of a stacked laminate type, comprising an electrode assembly in which a positive electrode and a negative electrode are arranged to face each other, an electrolyte liquid, and a package accommodating the electrode assembly and the electrolyte liquid, wherein the negative electrode is formed by binding a negative electrode active substance containing metal (a) capable of being alloyed with lithium, a metal oxide (b) capable of occluding and releasing lithium ions, and a carbon material (c) capable of occluding and releasing lithium ions, to a negative electrode current collector, with at least one selected from polyimides and polyamideimides; and the electrolyte liquid comprises an acrylonitrile compound that is acrylonitrile or an acrylonitrile derivative.

Advantageous Effects of Invention

In the present exemplary embodiment, use of an electrolyte liquid containing an acrylonitrile compound can suppress decomposition of the electrolyte liquid. Therefore, a high-performance secondary battery can be provided in which occurrences of the volume change of a battery and deformation of an electrode assembly are suppressed even in the case of using a laminate film as a package.

BRIEF DESCRIPTION OF DRAWINGS

FIG. 1 is a schematic cross-sectional diagram showing a structure of an electrode assembly of a secondary battery of a stacked laminate type.

DESCRIPTION OF EMBODIMENTS

Hereinafter, the present exemplary embodiment will be described in detail.

In the secondary battery according to the present exemplary embodiment, an electrode assembly in which a positive electrode and a negative electrode are arranged to face each other, and an electrolyte liquid are accommodated in a package. The shape of the secondary battery is a stacked laminate type. Hereinafter, a secondary battery of a stacked laminate type will be described.

FIG. 1 is a schematic cross-sectional diagram showing a structure of an electrode assembly of a secondary battery of a stacked laminate type. The electrode assembly has a planar stacked structure in which a positive electrode and a negative electrode are arranged to face each other, and the electrode assembly shown in FIG. 1 is formed by alternately stacking a plurality of positive electrodes c and a plurality of negative electrodes a with a separator b being interposed therebetween. Respective positive electrode current collectors e which the positive electrodes c have are mutually welded on the end of the each current collector which is not covered with a positive electrode active substance, to be thereby electrically connected, and further a positive electrode terminal f is welded to the welded portion. Respective negative electrode current collectors d which the negative electrodes a have are mutually welded on the end of the each current collector which is not covered with a negative electrode active substance, to be thereby electrically connected, and further a negative electrode terminal g is welded to the welded portion.

Since an electrode assembly having such a planar stacked structure has no portion of a small R (a region near a winding core of a wound structure), an advantage of the electrode assembly is that it is less adversely affected by volume change of the electrode that occurs in the charge/discharge cycle than an electrode assembly having a wound structure. However, an electrode assembly having a planar stacked structure has a problem that when gas is generated between electrodes, the generated gas is liable to stay between the electrodes. This is because whereas in the case of an electrode assembly having a wound structure, the intervals between the electrodes hardly expand due to a tension exerted on electrodes, in the case of an electrode assembly having a stacked structure, the intervals between the electrodes are liable to expand. In the case where the package is a laminate film, this problem becomes especially remarkable.

The present exemplary embodiment, even in the case where a laminate film is selected as the package, and the electrode assembly has a planar stacked structure, solves the above-mentioned problem, and allows long-life driving even in a stacked laminate-type lithium ion secondary battery using a high energy-type negative electrode.

[1] Negative Electrode

A negative electrode is formed by binding a negative electrode active substance on a negative electrode current collector with a negative electrode binder.

The negative electrode active substance in the present exemplary embodiment contains a metal (a) capable of being alloyed with lithium, a metal oxide (b) capable of occluding and releasing lithium ions, and a carbon material (c) capable of occluding and releasing lithium ions.

As metal (a), Al, Si, Pb, Sn, In, Bi, Ag, Ba, Ca, Hg, Pd, Pt, Te, Zn, La, or an alloy of two or more thereof can be used. In particular, it is preferable to contain silicon (Si) as metal (a).

As metal oxide (b), silicon oxide, aluminum oxide, tin oxide, indium oxide, zinc oxide, lithium oxide, or a composite thereof can be used. In particular, it is preferable to contain silicon oxide as metal oxide (b). This is because the silicon oxide is relatively stable and hardly causes reactions with other compounds. To metal oxide (b), one or two or more elements selected from nitrogen, boron and sulfur may be further added, for example, from 0.1 to 5% by mass. Thereby, the electroconductivity of metal oxide (b) can be improved.

As carbon material (c), graphite, amorphous carbon, diamond-like carbon, carbon nanotubes, or a composite thereof can be used. Here, graphite having a high crystallinity has a high electroconductivity, and has excellent adhesiveness with a positive electrode current collector including a metal such as copper, and excellent voltage flatness. By contrast, since amorphous carbon having a low crystallinity exhibits relatively small volume expansion, the amorphous carbon has a high advantage of relaxing the volume expansion of the negative electrode as a whole, and hardly causes deterioration caused by nonuniformity including crystal grain boundaries and defects.

The whole or a part of metal oxide (b) preferably has an amorphous structure. Metal oxide (b) of an amorphous structure can suppress volume expansion of carbon material (c) and metal (a), and can also suppress decomposition of an electrolyte liquid such as one containing a phosphate compound. This mechanism is not clear, but it is presumed that metal oxide (b) having an amorphous structure has some influence on the film formation at the interface between carbon material (c) and the electrolyte liquid. The amorphous structure is believed to have a relatively small constituent due to nonuniformity such as crystal grain boundary or a defect. The whole or a part of metal oxide (b) having an amorphous structure can be confirmed by X-ray diffractometry (common XRD measurement). Specifically, in the case where metal oxide (b) has no amorphous structure, a peak intrinsic to metal oxide (b) is observed, but in the case where the whole or a part of metal oxide (b) has an amorphous structure, a peak intrinsic to metal oxide (b) is observed as a broad peak.

Metal oxide (b) is preferably an oxide of a metal constituting metal (a). Metal (a) and metal oxide (b) are preferably silicon (Si) and silicon oxide (SiO), respectively.

The whole or a part of metal (a) is preferably dispersed in metal oxide (b). Dispersing at least a part of metal (a) in metal oxide (b) can further suppress the volume expansion of a negative electrode as a whole, and can also suppress the decomposition of an electrolyte liquid. The whole or a part of metal (a) being dispersed in metal oxide (b) can be confirmed by the combined use of the transmission electron microscopic observation (common TEM observation) and the energy dispersive X-ray spectroscopy (common EDX measurement). Specifically, it can be confirmed that the metal constituting the metal particle (a) has not been turned to an oxide of the metal, by observing the cross-section of a sample containing the metal particle (a) and measuring the oxygen concentration of the metal particle (a) dispersed in metal oxide (b).

As described above, the content of metal (a), the content of metal oxide (b) and the content of carbon material (c) with respect to the total of metal (a), metal oxide (b) and carbon oxide (c) are preferably 5% by mass or more and 90% by mass or less, 5% by mass or more and 90% by mass or less, and 2% by mass or more and 80% by mass or less, respectively. Also, the content of metal (a), the content of metal oxide (b) and the content of carbon material (c) with respect to the total of metal (a), metal oxide (b) and carbon material (c) are more preferably 20% by mass or more and 50% by mass or less, 40% by mass or more and 70% by mass or less, and 2% by mass or more and 30% by mass or less, respectively.

A negative electrode active substance wherein the whole or a part of metal oxide (b) has an amorphous structure, and the whole or a part of metal (a) is dispersed in the metal oxide (b) can be fabricated, for example, by the method as disclosed in Patent Literature 3. That is, subjecting metal oxide (b) to a CVD process under an atmosphere containing an organic gas such as methane gas can give a composite in which metal (a) in the metal oxide (b) is made into nano-clusters and is covered on the surface with carbon material (c). Alternatively, the negative electrode active substance can be fabricated by mixing carbon material (c), metal (a) and metal oxide (b) by mechanical milling Metal (a), metal oxide (b) and carbon material (c) that is used can be, but should not be particularly limited, a particle thereof. For example, the average particle diameter of metal (a) can be constituted to be smaller than the average particle diameters of carbon material (c) and metal oxide (b). With such a constitution, since the particle diameter of metal (a) in which little volume change occurs during the charge/discharge cycle is relatively small and the particle diameters of carbon material (c) and metal oxide (b) in which large volume change occurs are relatively large, the formation of dendrite and the micro-powdering of the alloy can be more effectively suppressed. Lithium is consequently occluded in and released from the large-sized particle, the small-sized particle and the large-sized particle in this order in the charge/discharge process, and also from this point, the generation of the residual stress and the residual strain is suppressed. The average particle diameter of metal (a) can be made to be, for example, 20 μm or smaller, and is preferably made to be 15 μm or smaller.

The average particle diameter of metal oxide (b) is preferably ½ or smaller than that of carbon material (c), and the average particle diameter of metal (a) is preferably ½ or smaller than that of metal oxide (b). It is more preferable that the average particle diameter of metal oxide (b) be ½ or smaller than that of carbon material (c), and the average particle diameter of metal (a) be ½ or smaller than that of metal oxide (b). Controlling the average particle diameters in such ranges can more effectively provide the effect of relaxing the volume expansion of the metal and the alloy phase, and can provide a secondary battery that has excellent balance between energy density, the cycle life and efficiency. More specifically, it is preferable that the average particle diameter of silicon oxide (b) be made to be ½ or smaller than that of graphite (c), and the average particle diameter of silicon (a) be made to be ½ or smaller than that of silicon oxide (b). Still more specifically, the average particle diameter of silicon (a) can be made to be, for example, 20 μm or smaller, and is preferably made to be 15 μm or smaller.

As the negative electrode binder, at least one selected from polyimides (PI) and polyamideimides (PAI) can be used. The use of polyimides or polyamideimides as the negative electrode binder can provide a good cycle characteristic, since the adhesivity between the negative electrode active substance and the current collector is increased, and the electric contact between the current collector and the negative electrode active substance is kept well even if the charge/discharge is repeated.

The content of a negative electrode binder is preferably in the range of 1 to 30% by mass, and more preferably 2 to 25% by mass, with respect to the total amount of a negative electrode active substance and the negative electrode binder. In the case where the content is 1% by mass or more, the adhesivity between active substances or between an active substance and a current collector is increased, and the cycle characteristic becomes to be good. In the case where the content is 30% by mass or less, the active substance ratio is improved, and thereby improve the negative electrode capacity.

The negative electrode current collector is not especially limited, but is preferably aluminum, nickel, copper, silver, or an alloy thereof because of the electrochemical stability. The shape thereof includes a foil, a plate-shape and a mesh-shape.

The negative electrode can be fabricated by forming a negative electrode active substance layer containing a negative electrode active substance and a negative electrode binder, on the negative electrode current collector. A formation method of the negative electrode active substance layer includes a doctor blade method, a die coater method, a CVD method, and a sputtering method. A negative electrode current collector may be made by forming a negative electrode active substance layer in advance, and thereafter forming a thin film of aluminum, nickel or an alloy thereof by a method such as vapor deposition or sputtering.

[2] Positive Electrode

A positive electrode is constituted, for example, by binding a positive electrode active substance on a positive electrode current collector with a positive electrode binder so as to cover the positive electrode current collector.

The positive electrode active substance includes lithium manganate having a lamellar structure or lithium manganate having a spinel structure such as $LiMnO_2$ and $Li_xMn_2O_4$ ($0<x<2$); $LiCoO_2$, $LiNiO_2$ and materials in which a part of the transition metal thereof are substituted with another metal; lithium transition metal oxides such as $LiNi_{1/3}Co_{1/3}Mn_{1/3}O_2$, in which the molar ratio of a specific transition metal is not more than one half; and materials which have lithium at a larger amount than the stoichiometric amount in these lithium transition metal oxides. Particularly, $Li_\alpha Ni_\beta Co_\gamma Al_\delta O_2$ ($1 \leq 1.2$, $\beta+\gamma+\delta=1$, $\beta \geq 0.7$, $\gamma \leq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, $\gamma \leq 0.2$) is preferable. The positive electrode active substance can be used singly or in combinations of two or more.

As a positive electrode binder, the same one as the negative electrode binder can be used. Above all, polyvinylidene fluoride is preferable from the viewpoint of versatility and low cost. The amount of a positive electrode binder is preferably 1 to 20% by mass, and more preferably 2 to 10% by mass with respect to the total amount of a positive electrode active substance and a positive electrode binder from the viewpoint of a "sufficient binding force" and "increased energy", which are in a tradeoff relationship.

As the positive electrode current collector, the same one as the negative electrode current collector can be used.

An electroconductive auxiliary material may be added to a positive electrode active substance layer containing a positive electrode active substance in order to reduce impedance. The electroconductive auxiliary material includes carbonaceous microparticles of graphite, carbon black, acetylene black and the like.

[3] Electrolyte Liquid

An electrolyte liquid used in the present exemplary embodiment comprises an acrylonitrile compound that is acrylonitrile or an acrylonitrile derivative. The acrylonitrile derivative has an acrylonitrile structure (C=C—CN). The use of an electrolyte liquid containing an acrylonitrile compound can suppress decomposition of the electrolyte liquid, and can suppress generation of a gas such as $CO_2$.

The acrylonitrile compound is preferably a compound represented by the following general formula (1).

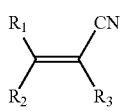

(1)

wherein $R_1$ to $R_3$ each independently denote hydrogen atom, an alkyl group, an aryl group, a heterocyclic group, an alkenyl group, an alkoxy group, an alkylcarbonyloxy group, an alkoxycarbonyl group, an arylthio group, an amino group, hydroxy group, a cyano group or a halogen atom; and these may be substituted.

In $R_1$ to $R_3$ in the above general formula (1), the alkyl group is preferably an alkyl group having 1 to 18 carbon atoms in total, more preferably an alkyl group having 1 to 12 carbon atoms in total, and still more preferably an alkyl group having 1 to 6 carbon atoms in total. The aryl group is preferably an aryl group having 6 to 18 carbon atoms in total, more preferably an aryl group having 6 to 12 carbon atoms in total, and still more preferably an aryl group having 6 to 10 carbon atoms in total. The heterocyclic group is preferably a heterocyclic group having 4 to 18 carbon atoms in total, more preferably a heterocyclic group having 4 to 12 carbon atoms in total, and a heterocyclic group having 4 to 10 carbon atoms in total. The alkenyl group is preferably an alkenyl group having 2 to 18 carbon atoms in total, more preferably an alkenyl group having 2 to 12 carbon atoms in total, and still more preferably an alkenyl group having 2 to 6 carbon atoms in total. The alkoxy group is preferably an alkoxy group having 1 to 18 carbon atoms in total, more preferably an alkoxy group having 1 to 12 carbon atoms in total, and still more preferably an alkoxy group having 1 to 6 carbon atoms in total. The alkylcarbonyloxy group is preferably an alkylcarbonyloxy group having 2 to 18 carbon atoms in total, more preferably an alkylcarbonyloxy group having 2 to 12 carbon atoms in total, and still more preferably an alkylcarbonyloxy group having 2 to 6 carbon atoms in total. The alkoxycarbonyl group is preferably an alkoxycarbonyl group having 2 to 18 carbon atoms in total, more preferably an alkoxycarbonyl group having 2 to 12 carbon atoms in total, and still more preferably an alkoxycarbonyl group having 2 to 6 carbon atoms in total. The arylthio group is preferably an arylthio group having 6 to 18 carbon atoms in total, more preferably an arylthio group having 6 to 12 carbon atoms in total, and still more preferably an arylthio group having 6 to 10 carbon atoms in total. The amino group is preferably an amino group having 0 to 6 carbon atoms in total, more preferably an amino group having 0 to 4 carbon atoms in total, and still more preferably an amino group having 0 to 2 carbon atoms in total. The halogen atom is preferably F, Cl or Br. The alkyl group includes straight-chain alkyl groups, branched-chain alkyl groups and cyclic alkyl groups.

$R_2$ and $R_3$ in the above general formula (1) may have a ring structure formed through a single bond or a double bond mutually formed by one of carbon atoms of the respective groups. In the case where the ring structure is formed, $R_2$ and $R_3$ are each independently preferably an alkyl group or an alkoxy group. A compound having a ring structure formed through a double bond formed by both $R_2$ and $R_3$ includes, for example, 2-furonitrile.

$R_1$ to $R_3$ may be substituted, and the substituent includes at least one selected from the group consisting of alkyl groups, cycloalkyl groups, alkenyl groups, alkynyl groups, alkoxy groups, alkylcarbonyl groups, arylcarbonyl groups, alkoxycarbonyl groups, aryloxycarbonyl groups, alkylcarbonyloxy groups, arylcarbonyloxy groups, aryl groups, aryloxy groups, alkylthio groups, arylthio groups, alkylthiocarbonyl groups, arylthiocarbonyl groups, alkylsulfinyl groups, arylsulfinyl group, alkylsulfonyl groups, arylsulfonyl groups, heteroatom-containing aromatic cyclic groups, amino groups, carboxy groups, hydroxy group, cyano groups, and halogen atoms. The number of carbon atoms in total described above is described in the concept including substituents.

These substituents more specifically include, for example, alkyl groups having 1 to 6 carbon atoms (for example, a methyl group, an ethyl group, a propyl group, an isopropyl group, and a butyl group), cycloalkyl groups having 3 to 6 carbon atoms (for example, a cyclopropyl group, a cyclobutyl group, a cyclopentyl group, and a cyclohexyl group), alkenyl groups having 2 to 6 carbon atoms (for example, a vinyl group, 1-propenyl group, 2-propenyl group, and 2-butenyl group), alkynyl groups having 2 to 6 carbon atoms (for example, an acetylenyl group, 1-propynyl group, 2-propynyl group, and 2-butynyl group), alkoxy groups having 1 to 6 carbon atoms (for example, a methoxy group, an ethoxy group, a n-propoxy group, an iso-propoxy group, a n-butoxy group, and a tert-butoxy group), alkylcarbonyl groups having 2 to 6 carbon atoms, arylcarbonyl groups having 7 to 11 carbon atoms, alkoxycarbonyl groups having 2 to 6 carbon atoms (for example, a methoxycarbonyl group, an ethoxycarbonyl group, and a tert-butoxycarbonyl group), aryloxycarbonyl groups having 7 to 11 carbon atoms, alkylcarbonyloxy groups having 2 to 6 carbon atoms, arylcarbonyloxy groups having 7 to 11 carbon atoms, aryl groups having 6 to 14 carbon atoms (for example, a phenyl group, a naphthyl group, and an anthracenyl group), aryloxy groups having 6 to 10 carbon atoms (for example, a phenoxy group and a naphthoxy group), alkylthio groups having 1 to 6 carbon atoms (for example, a methylthio group, an ethylthio group, a n-propylthio group, an iso-propylthio group, a n-butylthio group, and a tert-butylthio group), arylthio groups having 6 to 10 carbon atoms (for example, a phenylthio group and a naphthylthio group), alkylthiocarbonyl groups having 2 to 6 carbon atoms, arylthiocarbonyl groups having 7 to 11 carbon atoms, alkylsulfinyl groups having 1 to 6 carbon atoms, arylsulfinyl groups having 6 to 10 carbon atoms, alkylsulfonyl groups having 1 to 6 carbon atoms, arylsulfonyl groups having 6 to 10 carbon atoms, heteroatom-containing aromatic cyclic groups having 4 to 8 carbon atoms (for example, a furyl group and a thienyl group), alkyleneoxy groups having 1 to 6 carbon atoms, amino groups (including a dimethylamino group and a methylamino group), carboxy groups, hydroxy group, cyano groups, and halogen atoms (for example, a chlorine atom, and a bromine atom).

These acrylonitrile compounds can be used singly or as a mixture of two or more.

The reason why the decomposition of an electrolyte liquid is suppressed by use of an acrylonitrile compound as the electrolyte liquid is presumed to be due to the formation of an SEI (Solid Electrolyte Interface) film on a negative electrode by electrolytic polymerization. The formation of the film on the negative electrode surface by the acrylonitrile compound is believed to prevent the decomposition of the electrolyte liquid. Moreover, since the acrylonitrile compound forms a firm film, also the strength of the negative electrode is improved. Here, the consideration hitherto is just an assumption, and does not limit the present invention.

An acrylonitrile compound preferably functions also as a solvent.

The content of an acrylonitrile compound in an electrolyte liquid should not be particularly limited, but is preferably 0.1 to 30% by mass, more preferably 0.5 to 20% by mass, and still more preferably 1 to 5% by mass. In the case where the content of an acrylonitrile compound is 0.1% by mass or more, a film can be effectively formed on the negative electrode surface, and the decomposition of the electrolyte liquid can be effectively suppressed. In the case where the content of an acrylonitrile compound is 30% by mass or less, the increasing of the internal resistance of a battery due to the excessive growth of a SEI film can be easily suppressed.

The electrolyte liquid generally contains a nonaqueous electrolyte solvent other than an acrylonitrile compound. The nonaqueous electrolyte solvent is not especially limited, but includes aprotic organic solvents including, for example, cyclic-type carbonates such as propylene carbonate (PC), ethylene carbonate (EC), butylene carbonate (BC) and vinylene carbonate (VC); linear-type carbonates such as dimethyl carbonate (DMC), diethyl carbonate (DEC), ethyl methyl carbonate (EMC) and dipropyl carbonate (DPC); propylene carbonate derivatives; and aliphatic carboxylate esters such as methyl formate, methyl acetate and ethyl propionate. The nonaqueous electrolyte solvent is preferably cyclic-type or linear-type carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC) and dipropyl carbonate (DPC). The nonaqueous electrolyte solvent can be used singly or in combinations of two or more.

In the present exemplary embodiment, as a nonaqueous electrolyte solvent, a cyclic-type or linear-type carbonate is preferably used. Carbonate has advantages of improving the ionic dissociation of an electrolyte liquid due to its large relative permittivity, and of improving the ionic mobility due to ability of decreasing the viscosity of the electrolyte liquid. However, if a carbonate having a carbonate structure is used as an electrolyte liquid, the carbonate is liable to be decomposed to generate gas including $CO_2$. Particularly in the case of a stacked laminate-type secondary battery, if the gas is generated in the interior, the swelling problem remarkably occurs, thereby being liable to lead to the performance reduction. Then, in the present exemplary embodiment, by adding an acrylonitrile compound to the carbonate, the acrylonitrile compound can suppress the decomposition of an electrolyte liquid, thereby can suppress the generation of the gas. Therefore, in the present exemplary embodiment, an electrolyte liquid preferably contains an acrylonitrile compound and a cyclic-type or linear-type carbonate. Making an electrolyte liquid such a constitution can reduce problems including the gas generation even in the use of a carbonate as an electrolyte liquid, and can provide a high-performance secondary battery. The content of an acrylonitrile compound is preferably 1 to 30% by mass, and more preferably 2 to 20% by mass, with respect to the total amount of the acrylonitrile compound and a carbonate.

The electrolyte liquid further contains a supporting salt. The supporting salt includes lithium salts including, for example, $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting salts can be used singly or in combinations of two or more.

[4] Separator

As a separator, porous films or non-woven fabrics of polypropylene, polyethylene or the like can be used. As the separator, laminated ones thereof can also be used.

[5] Package

A package is a laminate film. The material of the laminate film should not be particularly limited, but polypropylene, polyethylene, or the like coated with aluminum or silica can be used. Particularly, an aluminum laminate film is preferably used from the viewpoint of suppressing the volume expansion.

In the present exemplary embodiment, since the generation of gas can be suppressed even in the case of using a laminate film as the package, the deformation including swelling due to the internal pressure of a secondary battery can be suppressed. Thereby, a lithium ion secondary battery of a stacked laminate type can be provided which is inexpensive and in which there is more broad latitude to change cell capacity by altering the stacking number.

EXAMPLES

Hereinafter, the present exemplary embodiment will be described specifically by way of Examples.

Example 1

A silicon of 5 μm in average particle diameter as metal (a), an amorphous silicon oxide ($SiO_x$, $0<x\leq2$) of 13 μm in average particle diameter as metal oxide (b), and a graphite of 30 μm in average particle diameter as carbon material (c) were weighed in the mass ratio of 29:61:10. Then, these materials were mixed for 24 hours by so-called mechanical milling to thereby obtain a negative electrode active substance. In the negative electrode active substance, the silicon that is metal (a) was dispersed in the silicon oxide ($SiO_x$, $0<x\leq2$) that is metal oxide (b).

The negative electrode active substance (average particle diameter: $D_{50}$=5 μm) and a polyimide (made by UBE Industries, Ltd., trade name: U Varnish A) as a negative electrode binder were weighed in the mass ratio of 85:15, and mixed with n-methylpyrrolidone to thereby prepare a negative electrode slurry. The negative electrode slurry was applied on a copper foil having a thickness of 10 μm, thereafter dried, and further subjected to a thermal treatment at 300° C. under a nitrogen atmosphere to thereby fabricate a negative electrode. In Table 1, the content (%) of a negative electrode binder indicates the content (% by mass) of the negative electrode binder in the negative electrode active substance and the negative electrode binder.

Lithium nickelate ($LiNi_{0.80}Co_{0.15}Al_{0.15}O_2$) as a positive electrode active substance, carbon black as an electroconductive auxiliary material, and polyvinylidene fluoride as a positive electrode binder were weighed in a mass ratio of 90:5:5. Then, these materials were mixed with n-methylpyrrolidone to thereby prepare a positive electrode slurry. The positive electrode slurry was applied to an aluminum foil having a thickness of 20 μm, thereafter dried, and further pressed to thereby fabricate a positive electrode.

Three layers of the obtained positive electrode and four layers of the obtained negative electrode were alternately stacked with a polypropylene porous film as a separator being interposed therebetween. Ends of the positive electrode current collectors which were not covered with the positive electrode active substance, and ends of the negative electrode current collectors which were not covered with the negative electrode active substance were each welded. Further to the respective welded portions, a positive electrode terminal made of aluminum and a negative electrode terminal made of nickel were respectively welded to thereby obtain an electrode assembly having a planar stacked structure.

On the other hand, acrylonitrile as an acrylonitrile compound and a carbonate nonaqueous electrolyte solvent were mixed in a proportion of 2 parts by mass and 98 parts by mass, respectively, to thereby prepare a mixed solution. $LiPF_6$ as a supporting salt was further dissolved in a concentration of 1 mol/l in the mixed solution to thereby prepare an electrolyte liquid. The carbonate nonaqueous electrolyte solvent used was a mixed solvent of EC/PC/DMC/EMC/DEC=20/20/20/20/20 (volume ratio). In Table 1, (d) represents an acrylonitrile compound, and a content of (d) (%) indicates the content (% by mass) of an acrylonitrile compound in the acrylonitrile compound and a carbonate nonaqueous electrolyte solvent.

The electrode assembly was packed with an aluminum laminate film as a package; and the electrolyte liquid was injected in the interior, and sealed while the pressure was reduced to 0.1 atm, to thereby fabricate a secondary battery.

<Evaluations>

(20° C. Cycle)

A test of repeating charge/discharge in the voltage range from 2.5 V to 4.1 V in a constant-temperature bath held at 20° C. was carried out on the fabricated secondary battery to thereby evaluate the maintenance rate (%) and the swelling (%). The results are shown in Table 1. In Table 1, the "maintenance rate (%)" represents (a discharge capacity at 150th cycle)/(a discharge capacity at the first cycle)×100 (unit: %). The "swelling (volume increase)(%)" represents {(a volume at 150th cycle)/(a volume at the first cycle)−1}×100 (%)(unit: %).

(60° C. Cycle)

A test of repeating charge/discharge in the voltage range from 2.5 V to 4.1 V in a constant-temperature bath held at 60° C. was carried out on the fabricated secondary battery to thereby evaluate the maintenance rate (%) and the swelling (%). The results are shown in Table 1. In Table 1, the "maintenance rate (%)" represents (a discharge capacity at 50th cycle)/(a discharge capacity at the first cycle)×100 (unit: %). The "swelling (volume increase)(%)" represents {(a volume at 50th cycle)/(a volume at the first cycle)−1}×100 (%)(unit: %).

Examples 2 to 62

Secondary batteries were fabricated and evaluated in the same manner as in Example 1, except that the kinds of the negative electrode binders and the kinds of the acrylonitrile compounds were selected as shown in Tables 1 to 4. The results are shown in Tables 1 to 4.

Example 63

According to the method described in Patent Literature 3, a negative electrode active substance was obtained which contained a silicon, an amorphous silicon oxide ($SiO_x$, $0<x\leq2$), and a carbon in the mass ratio of 29:61:10. In the negative electrode active substance, the silicon as metal (a) was dispersed in the amorphous silicon oxide as metal oxide (b). Then, the present Example was carried out in the same manner as Example 1, except that this negative electrode active substance was used. The results are shown in Table 4.

Example 64

The present Example was carried out in the same manner as Example 6, except that the negative electrode active substance used in Example 63 was used. The results are shown in Table 4.

Example 65

The present Example was carried out in the same manner as Example 8, except that the negative electrode active substance used in Example 63 was used. The results are shown in Table 4.

Example 66

The present Example was carried out in the same manner as Example 10, except that the negative electrode active substance used in Example 63. The results are shown in Table 4.

Example 67

The present Example was carried out in the same manner as Example 12, except that the negative electrode active substance used in Example 63 was used. The results are shown in Table 4.

Example 68

The present Example was carried out in the same manner as Example 15, except that the negative electrode active substance used in Example 63 was used. The results are shown in Table 4.

Example 69

The present Example was carried out in the same manner as Example 18, except that the negative electrode active substance used in Example 63 was used. The results are shown in Table 4.

Example 70

The present Example was carried out in the same manner as Example 19, except that the negative electrode active substance used in Example 63 was used. The results are shown in Table 4.

Comparative Examples 1 to 3

Secondary batteries were fabricated and evaluated in the same manner as Example 1, except that the kinds of the negative electrode binders shown in Table 4 was used, and except for not using an acrylonitrile compound. The results are shown in Table 4.

Comparative Examples 4 and 5

Secondary batteries were fabricated and evaluated in the same manner as Example 1, except that the kinds of the negative electrode binders and the kinds of the acrylonitrile compounds shown in Table 4 were used. The results are shown in Table 4.

Comparative Examples 6 and 7

Secondary batteries were fabricated and evaluated in the same manner as Example 1, except that graphite as the negative electrode active substances and the kinds of the negative electrode binders shown in Table 4 were used, and except for not using an acrylonitrile compound. The results are shown in Table 4.

TABLE 1

| | Negative Electrode Binder | | | | Content of (d) | 20° C. Cycle | | | | 60° C. Cycle | | | |
|---|---|---|---|---|---|---|---|---|---|---|---|---|---|
| | Si/SiO/C Ratio | Kind | Content (%) | Acrylonitrile compound (d) | (%) | Maintenance Rate (%) | Judgment | Swelling <Volume> (%) | Judgment | Maintenance Rate (%) | Judgment | Swelling <Volume> (%) | Judgment |
| Example 1 | 29/61/10 | PI | 15 | acrylonitrile | 2 | 85 | ○ | 1 | ○ | 82 | ○ | 6 | ○ |
| Example 2 | 29/61/10 | PI | 15 | methacrylonitrile | 2 | 82 | ○ | 2 | ○ | 68 | ○ | 8 | ○ |
| Example 3 | 29/61/10 | PI | 15 | crotononitrile | 2 | 75 | ○ | 3 | ○ | 51 | ○ | 13 | ○ |
| Example 4 | 29/61/10 | PI | 15 | 3-methylcrotononitrile | 2 | 71 | ○ | 5 | ○ | 52 | ○ | 12 | ○ |
| Example 5 | 29/61/10 | PI | 15 | 2-methyl-2-butene nitrile | 2 | 70 | ○ | 6 | ○ | 53 | ○ | 7 | ○ |
| Example 6 | 29/61/10 | PI | 15 | 2-pentenenitrile | 2 | 72 | ○ | 2 | ○ | 52 | ○ | 13 | ○ |
| Example 7 | 29/61/10 | PI | 15 | 3,7-dimethyl-2,6-octadiene nitrile | 2 | 77 | ○ | 2 | ○ | 58 | ○ | 9 | ○ |
| Example 8 | 29/61/10 | PI | 15 | 3-dimethylaminoacrylonitrile | 2 | 67 | ○ | 4 | ○ | 65 | ○ | 9 | ○ |
| Example 9 | 29/61/10 | PI | 15 | hydroxyacrylonitrile | 2 | 75 | ○ | 3 | ○ | 73 | ○ | 8 | ○ |
| Example 10 | 29/61/10 | PI | 15 | fumaronitrile | 2 | 67 | ○ | 6 | ○ | 57 | ○ | 15 | ○ |
| Example 11 | 29/61/10 | PI | 15 | 2-methyleneglutaronitrile | 2 | 75 | ○ | 2 | ○ | 62 | ○ | 6 | ○ |
| Example 12 | 29/61/10 | PI | 15 | cinnamonitrile | 2 | 70 | ○ | 3 | ○ | 61 | ○ | 8 | ○ |
| Example 13 | 29/61/10 | PI | 15 | 4-methoxycinnamonitrile | 2 | 79 | ○ | 2 | ○ | 77 | ○ | 9 | ○ |
| Example 14 | 29/61/10 | PI | 15 | dichloroacrylonitrile | 2 | 70 | ○ | 4 | ○ | 68 | ○ | 8 | ○ |
| Example 15 | 29/61/10 | PI | 15 | 2-furonitrile | 2 | 68 | ○ | 5 | ○ | 66 | ○ | 12 | ○ |
| Example 16 | 29/61/10 | PI | 15 | 2-furan acrylonitrile | 2 | 80 | ○ | 1 | ○ | 78 | ○ | 6 | ○ |
| Example 17 | 29/61/10 | PI | 15 | 3-ethoxyacrylonitrile | 2 | 74 | ○ | 3 | ○ | 72 | ○ | 10 | ○ |
| Example 18 | 29/61/10 | PI | 15 | (1-ethoxyethylidene)malononitrile | 2 | 81 | ○ | 1 | ○ | 79 | ○ | 6 | ○ |
| Example 19 | 29/61/10 | PI | 15 | 1-cyanovinyl acetate | 2 | 78 | ○ | 2 | ○ | 76 | ○ | 7 | ○ |
| Example 20 | 29/61/10 | PI | 15 | ethyl 2-cyanoacrylate | 2 | 81 | ○ | 1 | ○ | 79 | ○ | 6 | ○ |

TABLE 2

| | Negative Electrode Binder | | | | Content of (d) | 20° C. Cycle | | | | 60° C. Cycle | | | |
|---|---|---|---|---|---|---|---|---|---|---|---|---|---|
| | Si/SiO/C Ratio | Kind | Content (%) | Acrylonitrile compound (d) | (%) | Maintenance Rate (%) | Judgment | Swelling <Volume> (%) | Judgment | Maintenance Rate (%) | Judgment | Swelling <Volume> (%) | Judgment |
| Example 21 | 29/61/10 | PI | 15 | ethyl 2-cyano-3-methyl-2-butenoate | 2 | 75 | ○ | 4 | ○ | 73 | ○ | 9 | ○ |
| Example 22 | 29/61/10 | PI | 15 | ethyl 2-cyano-2-pentenoate | 2 | 70 | ○ | 3 | ○ | 68 | ○ | 8 | ○ |
| Example 23 | 29/61/10 | PI | 15 | diethyl dicyanofumarate | 2 | 67 | ○ | 4 | ○ | 65 | ○ | 10 | ○ |
| Example 24 | 29/61/10 | PI | 15 | ethyl 2-cyano-3-ethoxyacrylate | 2 | 69 | ○ | 3 | ○ | 67 | ○ | 11 | ○ |
| Example 25 | 29/61/10 | PI | 15 | methyl α-cyanocinnamate | 2 | 68 | ○ | 3 | ○ | 65 | ○ | 13 | ○ |
| Example 26 | 29/61/10 | PI | 15 | ethyl 2-cyano-3-phenyl-2-butenoate | 2 | 70 | ○ | 3 | ○ | 68 | ○ | 10 | ○ |
| Example 27 | 29/61/10 | PI | 15 | ethyl 2-cyano-3,3-diphenyl acrylate | 2 | 72 | ○ | 4 | ○ | 68 | ○ | 9 | ○ |
| Example 28 | 29/61/10 | PI | 15 | 2-cyanoethyl acrylate | 2 | 69 | ○ | 5 | ○ | 67 | ○ | 10 | ○ |
| Example 29 | 29/61/10 | PI | 15 | ethyl 2-cyano-3-dimethyl aminoacrylate | 2 | 72 | ○ | 2 | ○ | 72 | ○ | 7 | ○ |
| Example 30 | 29/61/10 | PI | 15 | tetracyanoethylene | 2 | 74 | ○ | 2 | ○ | 73 | ○ | 5 | ○ |
| Example 31 | 29/61/10 | PAI | 15 | acrylonitrile | 2 | 84 | ○ | 1 | ○ | 82 | ○ | 8 | ○ |
| Example 32 | 29/61/10 | PAI | 15 | methacrylonitrile | 2 | 83 | ○ | 2 | ○ | 68 | ○ | 9 | ○ |
| Example 33 | 29/61/10 | PAI | 15 | crotononitrile | 2 | 76 | ○ | 2 | ○ | 51 | ○ | 13 | ○ |
| Example 34 | 29/61/10 | PAI | 15 | 3-methyl crotononitrile | 2 | 67 | ○ | 5 | ○ | 52 | ○ | 12 | ○ |
| Example 35 | 29/61/10 | PAI | 15 | 2-methyl-2-butenenitrile | 2 | 71 | ○ | 6 | ○ | 53 | ○ | 15 | ○ |
| Example 36 | 29/61/10 | PAI | 15 | 2-pentenenitrile | 2 | 73 | ○ | 2 | ○ | 52 | ○ | 14 | ○ |
| Example 37 | 29/61/10 | PAI | 15 | 3,7-dimethyl-2,6-octadiene nitrile | 2 | 78 | ○ | 3 | ○ | 58 | ○ | 9 | ○ |
| Example 38 | 29/61/10 | PAI | 15 | 3-dimethylaminoacrylonitrile | 2 | 69 | ○ | 4 | ○ | 67 | ○ | 10 | ○ |
| Example 39 | 29/61/10 | PAI | 15 | hydroxyacrylonitrile | 2 | 74 | ○ | 3 | ○ | 72 | ○ | 8 | ○ |
| Example 40 | 29/61/10 | PAI | 15 | fumaronitrile | 2 | 68 | ○ | 5 | ○ | 57 | ○ | 14 | ○ |

TABLE 3

| | Negative Electrode Binder | | | | Content of (d) (%) | 20° C. Cycle | | | | 60° C. Cycle | | | |
|---|---|---|---|---|---|---|---|---|---|---|---|---|---|
| | Si/SiO/C Ratio | Kind | Content (%) | Acrylonitrile compound (d) | | Maintenance Rate (%) | Judgment | Swelling <Volume> (%) | Judgment | Maintenance Rate (%) | Judgment | Swelling <Volume> (%) | Judgment |
| Example 41 | 29/61/10 | PAI | 15 | 2-methyleneglutaronitrile | 2 | 77 | ○ | 2 | ○ | 62 | ○ | 10 | ○ |
| Example 42 | 29/61/10 | PAI | 15 | cinnamonitrile | 2 | 72 | ○ | 3 | ○ | 61 | ○ | 8 | ○ |
| Example 43 | 29/61/10 | PAI | 15 | 4-methoxycinnamonitrile | 2 | 78 | ○ | 2 | ○ | 76 | ○ | 9 | ○ |
| Example 44 | 29/61/10 | PAI | 15 | (4-fluorophenyl thio)acetonitrile | 2 | 80 | ○ | 4 | ○ | 78 | ○ | 10 | ○ |
| Example 45 | 29/61/10 | PAI | 15 | dichloroacrylonitrile | 2 | 71 | ○ | 4 | ○ | 69 | ○ | 8 | ○ |
| Example 46 | 29/61/10 | PAI | 15 | 2-furonitrile | 2 | 69 | ○ | 6 | ○ | 67 | ○ | 12 | ○ |
| Example 47 | 29/61/10 | PAI | 15 | 2-furan acrylonitrile | 2 | 81 | ○ | 1 | ○ | 79 | ○ | 11 | ○ |
| Example 48 | 29/61/10 | PAI | 15 | 3-ethoxyacrylonitrile | 2 | 76 | ○ | 3 | ○ | 74 | ○ | 10 | ○ |
| Example 49 | 29/61/10 | PAI | 15 | (1-ethoxyethylidene)malononitrile | 2 | 77 | ○ | 1 | ○ | 75 | ○ | 9 | ○ |
| Example 50 | 29/61/10 | PAI | 15 | 1-cyanovinyl acetate | 2 | 80 | ○ | 2 | ○ | 78 | ○ | 7 | ○ |
| Example 51 | 29/61/10 | PAI | 15 | 2-acetoxy-3-butene nitrile | 2 | 71 | ○ | 3 | ○ | 69 | ○ | 11 | ○ |
| Example 52 | 29/61/10 | PAI | 15 | ethyl 2-cyanoacrylate | 2 | 82 | ○ | 1 | ○ | 80 | ○ | 9 | ○ |
| Example 53 | 29/61/10 | PAI | 15 | ethyl 2-cyano-3-methyl-2-butenoate | 2 | 73 | ○ | 5 | ○ | 71 | ○ | 10 | ○ |
| Example 54 | 29/61/10 | PAI | 15 | ethyl 2-cyano-2-pentenoate | 2 | 76 | ○ | 3 | ○ | 74 | ○ | 8 | ○ |
| Example 55 | 29/61/10 | PAI | 15 | diethyl dicyanofumarate | 2 | 69 | ○ | 2 | ○ | 67 | ○ | 15 | ○ |
| Example 56 | 29/61/10 | PAI | 15 | ethyl 2-cyano-3-ethoxyacrylate | 2 | 70 | ○ | 3 | ○ | 68 | ○ | 13 | ○ |
| Example 57 | 29/61/10 | PAI | 15 | methyl α-cyanocinnamate | 2 | 71 | ○ | 4 | ○ | 65 | ○ | 13 | ○ |
| Example 58 | 29/61/10 | PAI | 15 | ethyl 2-cyano-3-phenyl-2-butenoate | 2 | 69 | ○ | 3 | ○ | 67 | ○ | 10 | ○ |
| Example 59 | 29/61/10 | PAI | 15 | ethyl 2-cyano-3,3-diphenyl acrylate | 2 | 74 | ○ | 4 | ○ | 68 | ○ | 9 | ○ |
| Example 60 | 29/61/10 | PAI | 15 | 2-cyanoethyl acrylate | 2 | 76 | ○ | 6 | ○ | 74 | ○ | 14 | ○ |

TABLE 4

| | Negative Electrode Binder | | | | Content of (d) (%) | 20° C. Cycle | | | | 60° C. Cycle | | | |
|---|---|---|---|---|---|---|---|---|---|---|---|---|---|
| | Si/SiO/C Ratio | Kind | Content (%) | Acrylonitrile compound (d) | | Maintenance Rate (%) | Judgment | Swelling <Volume> (%) | Judgment | Maintenance Rate (%) | Judgment | Swelling <Volume> (%) | Judgment |
| Example 61 | 29/61/10 | PAI | 15 | ethyl 2-cyano-3-dimethyl aminoacrylate | 2 | 72 | ○ | 4 | ○ | 72 | ○ | 10 | ○ |
| Example 62 | 29/61/10 | PAI | 15 | tetracyanoethylene | 2 | 74 | ○ | 2 | ○ | 73 | ○ | 5 | ○ |
| Example 63 | 29/61/10 | PI | 15 | acrylonitrile | 2 | 81 | ○ | 1 | ○ | 78 | ○ | 4 | ○ |
| Example 64 | 29/61/10 | PI | 15 | 2-pentenenitrile | 2 | 70 | ○ | 5 | ○ | 62 | ○ | 11 | ○ |
| Example 65 | 29/61/10 | PI | 15 | 3-dimethylaminoacrylonitrile | 2 | 65 | ○ | 11 | ○ | 60 | ○ | 13 | ○ |
| Example 66 | 29/61/10 | PI | 15 | fumaronitrile | 2 | 66 | ○ | 9 | ○ | 59 | ○ | 14 | ○ |
| Example 67 | 29/61/10 | PI | 15 | cinnamonitrile | 2 | 68 | ○ | 9 | ○ | 61 | ○ | 12 | ○ |
| Example 68 | 29/61/10 | PI | 15 | 2-furonitrile | 2 | 66 | ○ | 10 | ○ | 60 | ○ | 13 | ○ |
| Example 69 | 29/61/10 | PI | 15 | (1-ethoxyethylidene)malononitrile | 2 | 80 | ○ | 1 | ○ | 75 | ○ | 4 | ○ |
| Example 70 | 29/61/10 | PI | 15 | 1-cyanovinyl acetate | 2 | 75 | ○ | 4 | ○ | 72 | ○ | 6 | ○ |
| Comparative Example 1 | 29/61/10 | PVdF | 15 | none | 0 | 42 | X | 35 | X | 32 | X | 40 | X |
| Comparative Example 2 | 29/61/10 | PI | 15 | none | 0 | 48 | X | 25 | X | 42 | X | 35 | X |
| Comparative Example 3 | 29/61/10 | PAI | 15 | none | 0 | 47 | X | 28 | X | 41 | X | 24 | X |
| Comparative Example 4 | 29/61/10 | PVdF | 15 | acrylonitrile | 2 | 49 | X | 20 | X | 48 | X | 21 | X |
| Comparative Example 5 | 29/61/10 | PVdF | 15 | methacrylonitrile | 2 | 42 | X | 21 | X | 47 | X | 24 | X |
| Comparative Example 6 | 0/0/100 | PVdF | 15 | none | 0 | 40 | X | 38 | X | 34 | X | 42 | X |
| Comparative Example 7 | 0/0/100 | PI | 15 | none | 0 | 57 | X | 21 | X | 47 | X | 29 | X |

The present application claims the priority to Japanese Patent Application No. 2010-196620, filed on Sep. 2, 2010, the disclosure of which is incorporated herein by reference in its entirety.

Hitherto, the invention of the present application has been described with reference to the exemplary embodiment and Examples, but the invention of the present application is not limited to the above-mentioned exemplary embodiment and Examples. In the constitutions and details of the invention of the present application, various changes which are understood by a person skilled in the art can be made within the scope of the invention.

INDUSTRIAL APPLICABILITY

The present exemplary embodiment can be utilized in every industrial field necessitating an electric power source, and industrial fields related to the transportation, storage, and supply of electric energy. Specifically, the present exemplary embodiment can be utilized in electric power sources for mobile devices such as cell phones and notebook personal computers; electric power sources for movement and transportation media including electric vehicles such as electric cars, hybrid cars, electric motorbikes and electric assist bicycles, and electric trains, satellites and submarines; backup electric power sources such as UPS; electric power storage facilities to store electric power generated by photovoltaic power generation, wind power generation and the like; and the like.

REFERENCE SIGNS LIST a negative electrode
b separator
c positive electrode
d negative electrode current collector
e positive electrode current collector
f positive electrode terminal
g negative electrode terminal

What is claimed is:

1. A secondary battery, comprising an electrode assembly in which a positive electrode and a negative electrode are arranged to face each other, an electrolyte liquid, and a package accommodating the electrode assembly and the electrolyte liquid,
wherein the negative electrode is formed by binding a negative electrode active substance containing a metal (a) capable of being alloyed with lithium, a metal oxide (b) capable of occluding and releasing lithium ions, and a carbon material (c) capable of occluding and releasing lithium ions, to a negative electrode current collector, with at least one negative electrode binder selected from polyimides and polyamideimides,
wherein the electrolyte liquid comprises an acrylonitrile compound that is acrylonitrile or an acrylonitrile derivative,
wherein the metal (a) is silicon and the metal oxide (b) is silicon oxide,
wherein a content of each of the metal (a), the metal oxide (b) and the carbon material (c) with respect to a total content of the metal (a), the metal oxide (b) and the carbon material (c) is 20-50% by mass, 40-70% by mass and 2-20% by mass, respectively,
wherein a content of the negative electrode binder with respect to a total content of the negative electrode active substance and the negative electrode binder is 1 to 30% by mass, and
wherein a content of the acrylonitrile compound in the electrolyte liquid is 0.1 to 30% by mass.

2. The secondary battery according to claim 1, wherein the acrylonitrile compound is a compound represented by the following general formula (1):

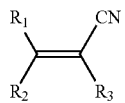

wherein $R_1$ to $R_3$ each independently denote hydrogen atom, an alkyl group, an aryl group, a heterocyclic group, an alkenyl group, an alkoxy group, an alkylcarbonyloxy group, an alkoxycarbonyl group, an arylthio group, an amino group, hydroxy group, a cyano group or a halogen atom; and these may be substituted.

3. The secondary battery according to claim 1, wherein the electrolyte liquid further comprises a linear-type or cyclic-type carbonate.

4. The secondary battery according to claim 3, wherein a content of the acrylonitrile compound is 1 to 30% by mass with respect to the total amount of the acrylonitrile compound and the carbonate.

5. The secondary battery according to claim 1, wherein the whole or a part of the metal oxide (b) has an amorphous structure.

6. The secondary battery according to claim 1, wherein the whole or a part of the metal (a) is dispersed in the metal oxide (b).

7. The secondary battery according to claim 1, wherein the package is an aluminum laminate film.

8. The secondary battery according to claim 2, wherein the electrolyte liquid further comprises a linear-type or cyclic-type carbonate.

9. The secondary battery according to claim 8, wherein a content of the acrylonitrile compound is 1 to 30% by mass with respect to the total amount of the acrylonitrile compound and the carbonate.

10. The secondary battery according to claim 2, wherein $R_1$ to $R_3$ each independently denote a hydrogen atom, a heterocyclic group, an alkoxy group, an alkylcarbonyloxy group, an alkoxycarbonyl group, an arylthio group, an amino group, hydroxy group, or a halogen atom, and at least one of $R_1$ to $R_3$ denote a heterocyclic group, an alkoxy group, an alkylcarbonyloxy group, an alkoxycarbonyl group, an arylthio group, an amino group, hydroxy group, or a halogen atom.

11. The secondary battery according to claim 1, wherein the acrylonitrile compound is acrylonitrile, methacrylonitrile, crotononitrile, 3-methylcrotononitrile, 2-methyl-2-butene nitrile, 2-pentenenitrile, 3,7-dimethyl-2,6-octadiene nitrile, 3-dimethylaminoacrylonitrile, hydroxyacrylonitrile, fumaronitrile, 2-methyleneglutaronitrile, cinnamonitrile, 4-methoxycinnamonitrile, dichloroacrylonitrile, 2-furonitrile, 2-furan acrylonitrile, 3-ethoxyacrylonitrile, (1-ethoxyethylidene)malononitrile, 1-cyanovinyl acetate, ethyl 2-cyanoacrylate, ethyl 2-cyano-3-methyl-2-butenoate, ethyl 2-cyano-2-pentenoate, diethyl dicyanofumarate, ethyl 2-cyano-3-ethoxyacrylate, methyl α-cyanocinnamate, ethyl 2-cyano-3-phenyl-2-butenoate, ethyl 2-cyano-3,3-diphenyl acrylate, 2-cyanoethyl acrylate, ethyl 2-cyano-3-dimethyl aminoacrylate, or tetracyanoethylene.

12. The secondary battery according to claim 1, wherein the negative electrode is formed by binding the negative electrode active substance to the negative electrode current collector with polyamideimides.

13. The secondary battery according to claim 1, wherein the electrode assembly has a stacked structure, and the package is a laminate film.

* * * * *

UNITED STATES PATENT AND TRADEMARK OFFICE
CERTIFICATE OF CORRECTION

Page 1 of 1

PATENT NO. : 9,466,827 B2
APPLICATION NO. : 13/820451
DATED : October 11, 2016
INVENTOR(S) : Midori Shimura et al.

It is certified that error appears in the above-identified patent and that said Letters Patent is hereby corrected as shown below:

Column 6, Line 53: Delete "($1 \leq 1.2$," and insert --($1 \leq \alpha \leq 1.2$,--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*